US009969602B2

(12) United States Patent
Chomko

(10) Patent No.: US 9,969,602 B2
(45) Date of Patent: May 15, 2018

(54) INSULATED BOOM KNUCKLE COVER FOR HIGH VOLTAGE LINE TRUCK

(71) Applicant: Lane Matthew Chomko, Edwardsville, IL (US)

(72) Inventor: Lane Matthew Chomko, Edwardsville, IL (US)

( * ) Notice: Subject to any disclaimer, the term of this patent is extended or adjusted under 35 U.S.C. 154(b) by 0 days. days.

(21) Appl. No.: 15/292,175

(22) Filed: Oct. 13, 2016

(65) Prior Publication Data

US 2018/0105408 A1 Apr. 19, 2018

(51) Int. Cl.

| | |
|---|---|
| ***H02G 3/04*** | (2006.01) |
| ***B66F 17/00*** | (2006.01) |
| ***H01B 17/56*** | (2006.01) |
| *B66F 11/04* | (2006.01) |

(52) U.S. Cl.

CPC ........... *B66F 17/006* (2013.01); *H01B 17/56* (2013.01); *B66F 11/04* (2013.01)

(58) Field of Classification Search

None

See application file for complete search history.

(56) References Cited

U.S. PATENT DOCUMENTS

| | | | | |
|---|---|---|---|---|
| 7,839,256 B2 * | 11/2010 | Bradford | H01B 17/00 | 174/135 |
| 8,969,721 B2 * | 3/2015 | Morin | B66C 23/88 | 174/138 F |
| 2015/0107892 A1 * | 4/2015 | Lynch | H01B 17/56 | 174/5 SB |
| 2015/0207305 A1 * | 7/2015 | Lynch | H01B 17/00 | 174/40 CC |

* cited by examiner

*Primary Examiner* — Dimary Lopez Cruz

(74) *Attorney, Agent, or Firm* — Williams Intellectual Property; Benjamin F. Williams

(57) ABSTRACT

An insulated boom knuckle cover for high voltage line truck includes an insulating sheathing unit disposed for expedient attachment to a boom arm of a high voltage line truck. The sheathing unit includes an upper section, attachable to the boom arm at a position proximal a knuckle of the boom arm, and an arched knuckle cover section disposed depending from the upper section. The arched knuckle cover section includes a lowermost portion disposed to overlie the knuckle of the boom arm when the boom arm is disposed in a lowered, folded position, and yet maintain appropriate coverage of the knuckle when the boom arm is also extended away from the lowered, folded position. The present invention therefore prevents direct contact of high voltage lines with the knuckle, or portions of the boom arm proximal the knuckle, and shields the knuckle from arcing.

7 Claims, 4 Drawing Sheets

INSULATED BOOM KNUCKLE COVER FOR HIGH VOLTAGE LINE TRUCK

BACKGROUND OF THE INVENTION

Working on high voltage lines is a dangerous job. Despite many precautions enforced by the profession, lethal accidents still occur. Due to the location of high voltage transmission lines spanning the landscape removed from contact with ground surfaces, linemen typically drive vehicles to specific locations where an outage is determined or where maintenance or repair is required. Resultantly, linemen are mobile operators, and are typically raised towards a targeted high voltage transmission line by mechanical action of an articulated boom arm drivable from manual controls disposed in a bucket lift connected to a vehicle. To protect the lineman, this bucket lift is typically insulated, often wrought of fiberglass or another non-conducting material. Additionally, insulating shields connectable to the bucket lift directly are sometimes employed to protect the operator from direct contact with high voltage lines.

However, problems nonetheless result and lethal accidents still occur. High voltage lines are often proximal additional lines, some at various heights relative one another. This means that targeting some lines, or any particular line, may inadvertently bring the operator, the bucket lift, and/or the boom arm itself, into proximity to other lines.

Additionally, the controls by which the lineman may direct the bucket lift must string electrical circuits and hydraulic lines through the boom arm to effect the necessary mechanical action. In some circumstances, these conduits can become conductors and channel current actually into the bucket lift whereat the lineman is directing the controls.

While portions of the boom arm and the bucket lift itself are often insulated, either with appropriate surface materials or by construction out of insulating materials themselves, portions of the boom arm (which must exhibit tensile strength and rigidity to maintain the bucket lift aloft) typically include conducting materials, such as metals. Particularly, the knuckle of the boom arm—that is, the articulated joint enabling pivotal action of the boom arm—is often wrought of metal hinged together. Due to the movement of the boom arm around this knuckle, covering of the knuckle itself is problematic. Thus, especially when directing the bucket lift to particular lines above additional lines, the knuckle can be subject to arcing from proximal lines and, in some instances, inadvertent contact with the lines themselves. This can cause a lethal accident.

What is needed is an insulated boom knuckle cover for high voltage line truck that enables expedient attachment to the boom arm of a variety of trucks, without impeding the movement of the boom arm, and enables shielding of the knuckle from contact with, or arcing from, proximal high voltage transmission lines.

FIELD OF THE INVENTION

The present invention relates to an insulated boom knuckle cover for high voltage line truck that is expediently attachable to a boom arm of a high voltage line truck. The present invention enables securement or an upper section to a boom arm in a position appropriate to orient an arched knuckle cover section overlying the knuckle of the boom arm when the boom arm is disposed in a lowered, folded position, whereby motorized travel of the truck does not effect displacement of the insulated boom knuckle cover for high voltage line truck. Moreover, extension of the boom arm to raise the associated bucket lift for action at an overhead line is not impeded as the arched knuckle cover section is not directly attached to the boom arm itself, but accommodates movement of the boom arm pivoting at the knuckle and maintains a position overtop the knuckle to shield the knuckle from inadvertent contact with, or unexpected arcing from, a proximally located high voltage line.

SUMMARY OF THE INVENTION

The present insulated boom knuckle cover for high voltage line truck has been devised to increase safety for line repair crews tending to maintenance and repair of high voltage transmission lines. While bucket lifts associated with such high voltage line trucks are typically well insulated, being rendered of fiber glass, for example, portions of the boom arm itself, which are articulated to enable raising and lowering of the bucket lift, are sometimes exposed, particularly at the knuckle of the boom—that is, the hinged section enabling articulation of the boom arm between a lowered, folded position, and positions extended away from said lowered, folded position, as when the bucket lift is raised and oriented towards a targeted line.

Bolts and fasteners, and other conductors, can enable inadvertent arcing of current from proximal high voltage lines to ground through the boom arm, which presents a danger to linemen operating the bucket lift, where hydraulic lines and circuitry enabling manipulation of the bucket lift may also act as conduction pathways for current. Since the lineman typically has his hands engaged upon the controls of the bucket lift during operation of the lift, this presents a hazard and potential danger not addressed in current embodiments of line trucks seen in the art.

Further, many linemen are dispatched to tend to fallen lines in inclement and even stormy weather. Precipitation during such weather may enable conduction along insulated surfaces or materials, more especially when these surfaces are integrated and congruent with the boom arm. Thus, even insulated sections of the boom arm can become pathways for current to ground, and thereby endanger linemen operative in the bucket lift.

The present insulated boom knuckle cover for high voltage line truck, therefore, enables taut and secure attachment of an insulated sheathing unit to the articulated boom arm in a position appropriate to depend an arched knuckle cover section over the knuckle of the boom and thereby shield potentially otherwise exposed conductors from proximity to, and direct contact with, high voltage lines around which the bucket lift is subsequently directed.

The present insulated boom knuckle cover for high voltage line truck, therefore, includes an insulated sheathing unit disposed for securement to a boom arm. The insulated sheathing unit includes an upper section and an arched knuckle cover section disposed depending from the upper section, said knuckle cover section thereby oriented over the knuckle of the boom arm when the boom arm is disposed in the lowered, folded position, and also when the boom arm is extended away from said lowered, folded position, without said knuckle cover section inhibiting movement of the boom arm.

The upper section includes a convex exterior surface, a concave interior surface, and each of a pair of side wall sections disposed sideways bounding said upper section. A plurality of corrugations is disposed longitudinally along the upper section between each of the pair of side wall sections, whereby direct contact between the upper section and the underlying boom arm is limited at each of the plurality of corrugations and contact, therefore, between the interior surface and the boom arm is prevented between each of the plurality of corrugations.

Each of the plurality of corrugations enables position of the upper section secured to a boom arm oriented such that any bolts or fasteners as may be protruding upon the surface of the boom arm are accommodated between the corrugations. Additionally, passage of water between the corrugations prevents pooling of liquid during work in inclement weather, as when restoring lines downed in a storm. Thus inadvertent surface conduction effected through standing water is limitable. Further, any surface conduction along wet portions of the boom arm are less likely to occur over the upper section.

A plurality of strap members is disposed upon the interior surface, each of said plurality of strap members connected to the interior surface at an attachment point upon the upper section. Each of the plurality of strap members is thereby unconnected to either of the pair of side walls, and taught engagement of each of the plurality of strap members to effect taut securement to the boom arm does not affect the shape or lie of either of the pair of side wall sections upon the boom arm. Each of the pair of side walls are thus enabled parallel situation bounding each side of the boom arm.

Each of the plurality of strap members includes a first strap part and a second strap part securable together in taut engagement by action of a ratchet clamp. The upper section is thereby adjustably securable between a variety of boom arms having varying shapes, diameters, and dimensions.

The arched knuckle cover section is disposed endwise depending from the upper section. The knuckle cover section includes a first portion, disposed congruently extended from the upper section, and a lowermost portion disposed at an obtuse angle relative the first portion. The lowermost portion is angled towards the interior surface of the upper section and thus overlies the knuckle when the boom arm is disposed in the lowered, folded position. Operating the truck in travel between locations with the present device attached to the boom arm, therefore, does not effect separation of the device from the boom arm. Furthermore, the lowermost section shields the knuckle when the boom arm is deployed to extend the bucket lift to a targeted position proximal high voltage lines.

The present insulated boom knuckle cover for high voltage line truck, therefore, enables a cost effective means of increasing safety for linemen operating various models and makes of trucks, by preventing accidental contact of conducting portions of an articulated boom arm with nearby high voltage lines (especially in locations where multiple lines present obstacles to a targeted line, as when there are higher and lower lines present) and, furthermore, prevents arcing to conducting portions of the boom arm during work on high voltage transmission lines.

Thus has been broadly outlined the more important features of the present insulated boom knuckle cover for high voltage line truck so that the detailed description thereof that follows may be better understood and in order that the present contribution to the art may be better appreciated.

Objects of the present insulated boom knuckle cover for high voltage line truck, along with various novel features that characterize the invention are particularly pointed out in the claims forming a part of this disclosure. For better understanding of the insulated boom knuckle cover for high voltage line truck, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
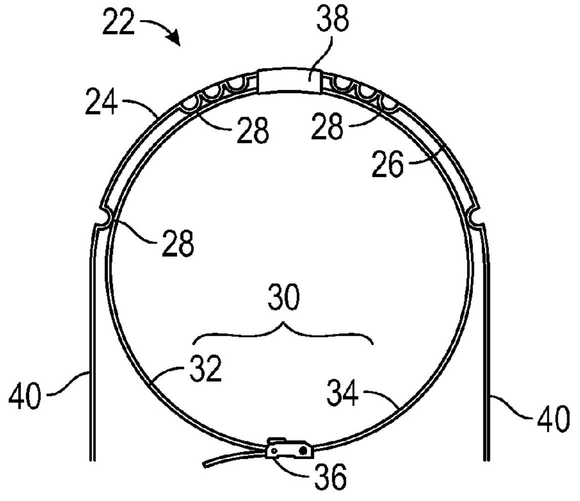
FIG. 1 is a cross-section view of an example embodiment of an upper section.

With reference now to the drawings, and in particular FIGS. 1 through 8 thereof, example of the instant insulated boom knuckle cover for high voltage line truck employing the principles and concepts of the present insulated boom knuckle cover for high voltage line truck and generally designated by the reference number 10 will be described.

Referring to FIGS. 1 through 8 a preferred embodiment of the present insulated boom knuckle cover for high voltage line truck 10 is illustrated.

The present insulated boom knuckle cover for high voltage line truck 10 has been devised to enable shielding of the knuckle 70 of the boom arm 100 of a high voltage line truck 500 and thereby prevent inadvertent direct contact between said knuckle 70 of the boom arm 100 with high voltage lines 700 during extension of a bucket lift 750 and, also, to prevent arcing from the lines 700 to conductors present upon the boom arm 100 as may otherwise occur when oriented into dangerous proximity to the lines 700.

Figure 5:
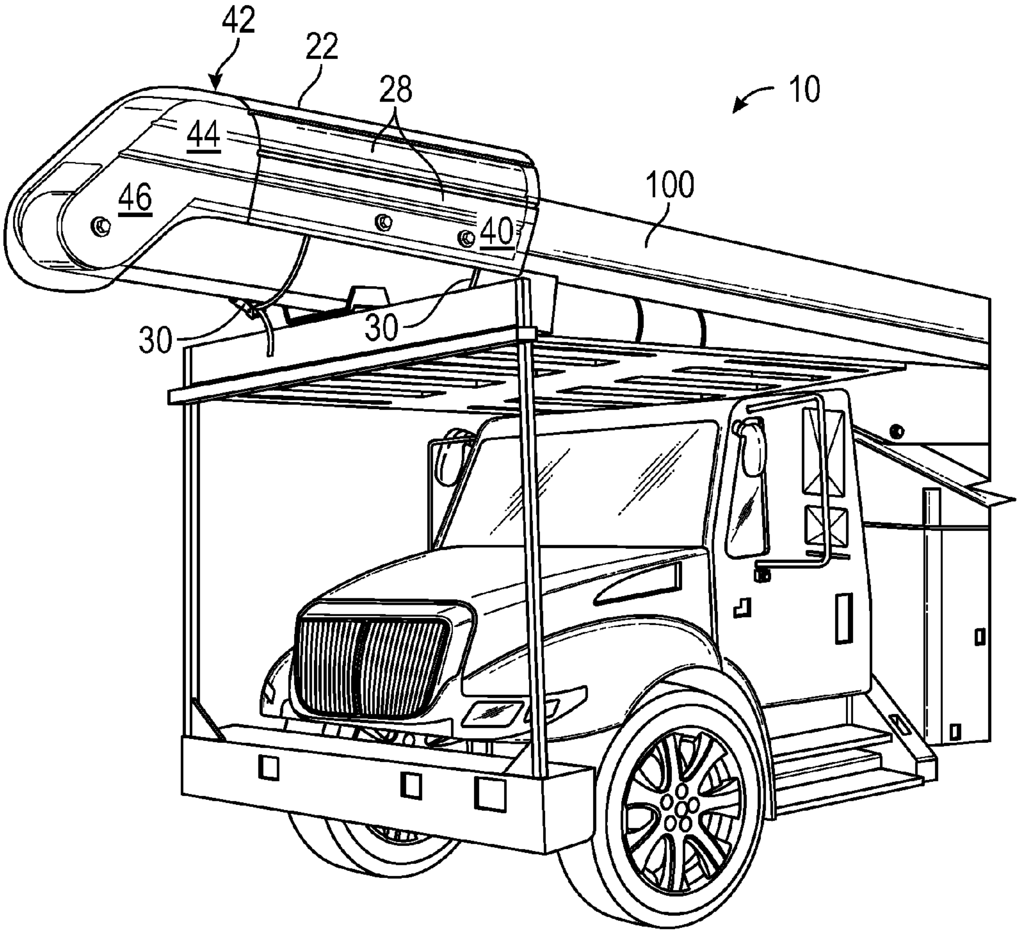
FIG. 5 is an in-use detail view of an example position attached to a boom arm, said boom arm disposed in a lowered, folded position.
Figure 6:
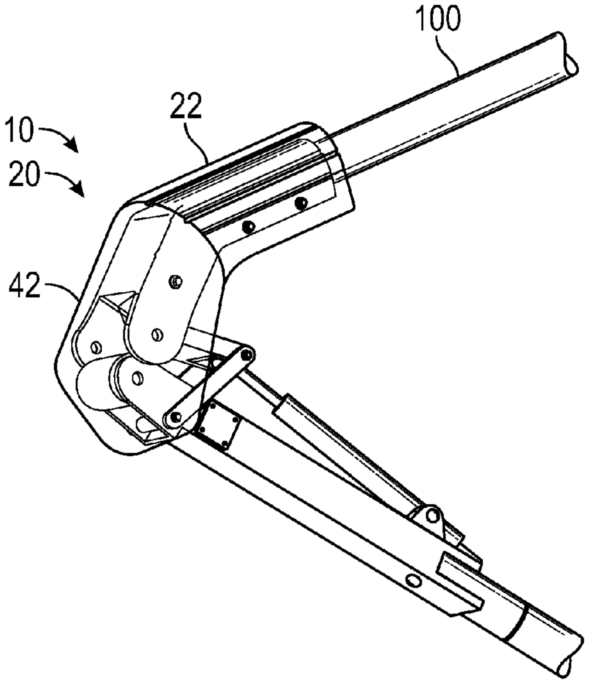
FIG. 6 is an in-use detail view of an example embodiment disposed upon a boom arm extended away from the lowered, folded position.
Figure 7:
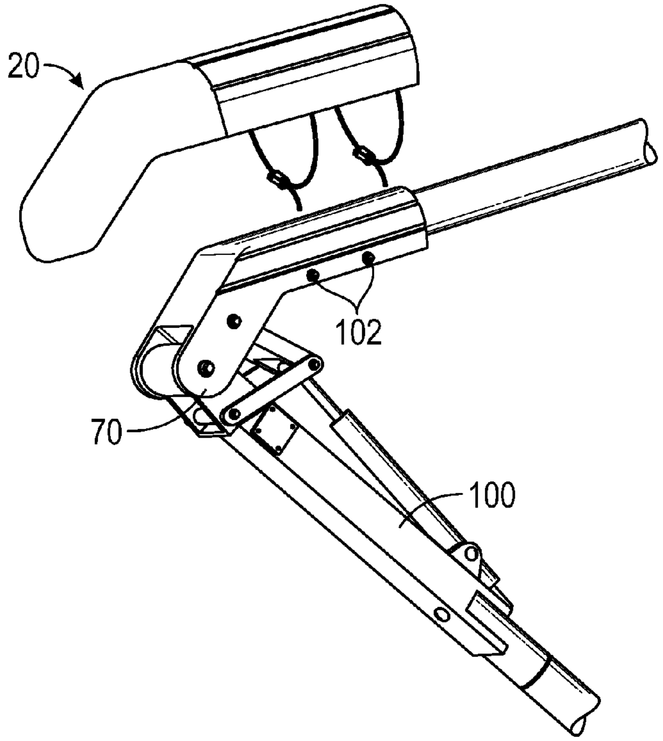
FIG. 7 is an exploded view illustrative of correct attachment of an example embodiment to the boom arm.
Figure 8:
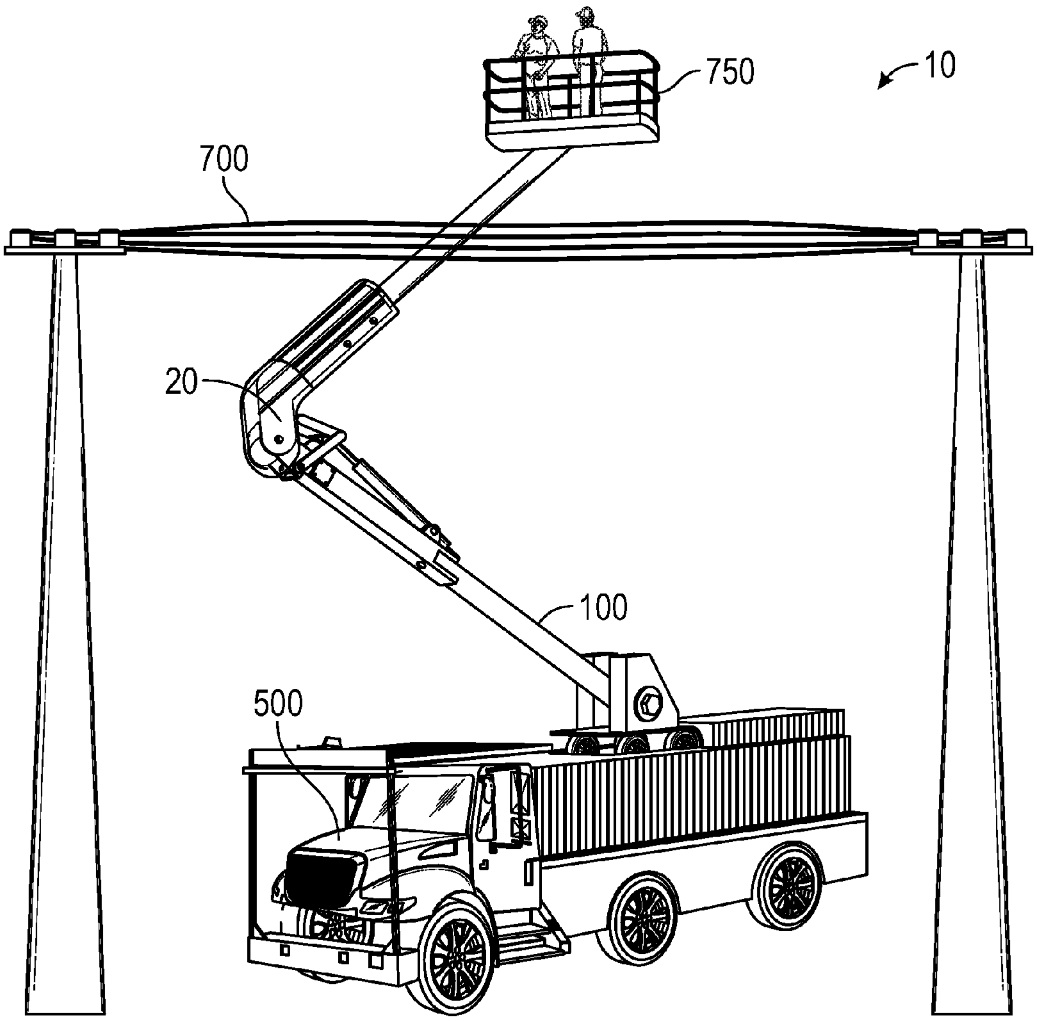
FIG. 8 is an in-use view of an example embodiment.

The present insulated boom knuckle cover for high voltage line truck 10, therefore, includes an insulated sheathing unit 20, disposed to shield the boom arm 100 and knuckle 70 from direct contact with proximal high voltage lines 700. The insulated sheathing unit 20 includes an upper section 22 and an arched knuckle cover section 42 disposed depended from the upper section 22 in appropriate array to overlie the knuckle 70 of the boom arm 100 when the boom arm 100 is disposed in a lowered, folded position (as shown in FIG. 5, for example), and shield the knuckle 70 when the boom arm 100 is extended away from the lowered, folded position (as shown in FIGS. 6 and 8 for example).

The arched knuckle cover 42 is disposed to depend from the upper section 22 unattached directly to the boom arm 100 whereby a lowermost portion 46, disposed at an obtuse angle relative a first portion 44, accommodates movement of the knuckle 70 during extension of the boom arm 100 and enables shielding of the knuckle 70 thereat.

Figure 2:
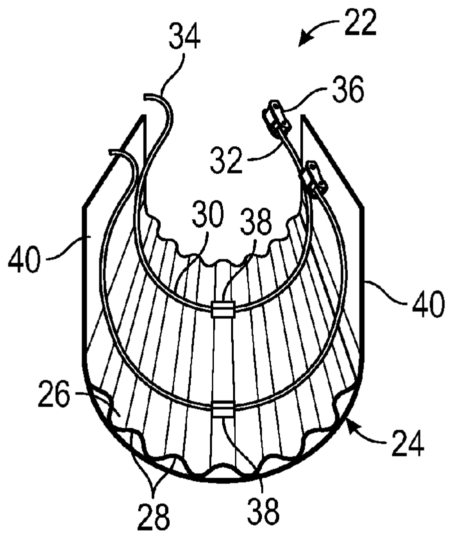
FIG. 2 is an elevation view of an example embodiment of a concave surface of the upper section.
Figure 3:
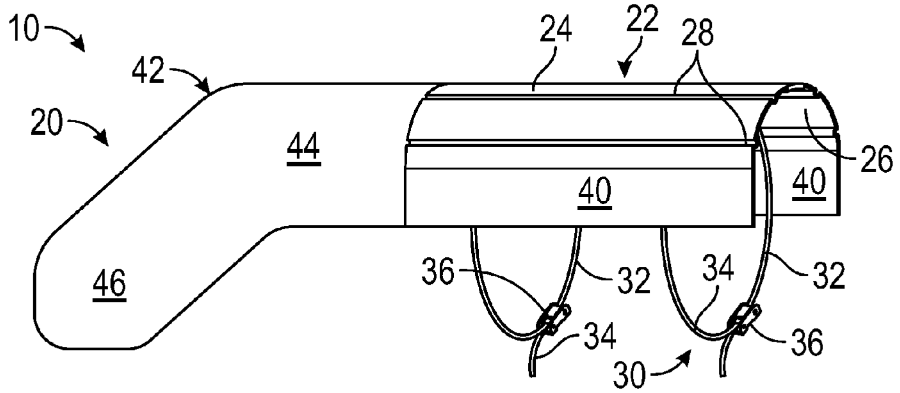
FIG. 3 is a side elevation view of an example embodiment.
Figure 4:
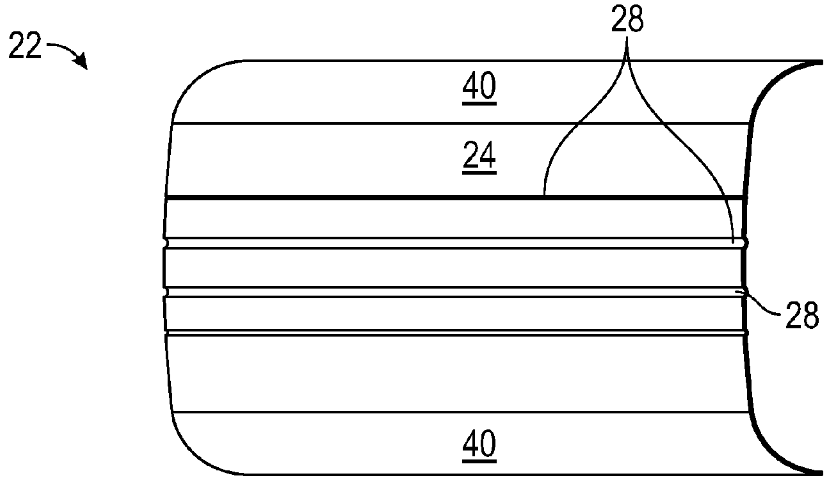
FIG. 4 is an top elevation view of an example embodiment.

The upper section 22 is disposed to secure to the boom arm 100. As shown in FIGS. 1, 2 and 3, the upper section 22 is arched and fluted, having a convex exterior surface 24 and a concave interior surface 26. A plurality of corrugations 28 is disposed longitudinally along the upper section 22, each of said corrugations 28 disposed to directly contact the boom arm 100 while maintaining the upper section 22 removed from contact with the boom arm 100 between each of said plurality of corrugations 28. Bolts and fasteners 102 disposed upon the boom arm 100, as case may be, are thereby accommodated underneath the upper section 22, without said fasteners 102 contacting the upper section 22 interior surface 26, whereby stress effected against the upper section 22 from such irregular contact with the boom arm 100 is avoidable. Moreover, water as may be present during precipitation (such as when effecting maintenance or repair during a storm, as is frequently required in the art) is enabled passage along the boom arm 100 between each of the plurality of corrugations 28 thereby limiting pooling or retention of liquid upon the boom arm 100 whereat conduction through wet sections of the boom arm 100 is likewise limitable.

A plurality of strap members 30 is disposed upon the interior surface 26 of the upper section 22 and attached at an attachment point 38 thereupon. Each of said plurality of strap members 30 includes at least a first strap part 32 and a second strap part 34 securable together around the boom arm 100 to effect taut attachment of the upper section 22 thereto. A plurality of ratchet clamps 36 may be included to secure each of the plurality of strap members 30 together, and enable taut engagement of each of the plurality of strap members 30 in position around the boom arm 100. Thus the present invention 10 is securable to a variety of boom arms extant in the art.

Each of a pair of side wall sections 40 is disposed longitudinally sideways bounding the upper section 22. Each of the pair of side walls 40 is disposed to overlie side portions of the boom arm 100 (see for example FIGS. 5 through 8). Significantly, each of the plurality of strap members 30 is not directly attached to either of the pair of side wall sections 40, whereby each of the pair of side wall sections 40 is enabled to depend overtop the side portions of the boom arm 100 without tautness of each of the plurality of strap members 30 affecting the lie of each of the pair of side wall sections 40 thereupon (see for example FIGS. 1 and 2).

The arched knuckle cover section 42 is disposed extended from the upper section 22 to overlie the knuckle 70 of the articulated boom arm 100. The knuckle cover section 42 includes a first portion 44, disposed coplanar with the upper section 22 and extended therefrom, and a lowermost portion 46 disposed at an obtuse angle relative the first portion 44. The lowermost portion 46 therefore rests overtop the knuckle 70 of the boom arm 100 when the boom arm 100 is disposed in a lowered, folded position (as when the truck is in motion, for example) and yet maintains shielding of the knuckle 70 during extension of the boom arm 100 away from the folded position (see FIGS. 5 through 8, for example).

In the example embodiment herein illustrated, it is contemplated that the upper section 22 may be rendered of fiberglass or a non-conducting polymer, or include a fiberglass exterior surface 24 and a polymeric interior surface 26, for example. The knuckle cover section 42 is likewise contemplated as rendered of a nonconductor such as fiberglass, rubber, polymer, or another rubberlike, heavy-duty nonconductive material suitable to prevent conduction when contacting high voltage lines and to prevent arcing through to the underlying knuckle 70.

Thus the upper section 22 is securable to the boom arm 100 proximal the knuckle 70 and the knuckle cover section 42 is maintainable in an appropriate position to shield the knuckle 70 from contact with high voltage lines 700 to which the bucket lift 750 is oriented by a user, and arcing from proximity of the knuckle 70 relative any high voltage line 700, and direct contact with any high voltage line 700 during orientation of the bucket lift 750, is thereby avoidable.

What is claimed is:

1. An insulated boom knuckle cover for high voltage line truck comprising an insulated sheathing unit attachable overtop of a knuckle of an articulated boom arm used for extending a bucket lift for maintenance and repair of high voltage lines, said insulated sheathing unit comprising:

an upper section attachable to the boom arm, said upper section including a longitudinally disposed plurality of corrugations; and an arched knuckle cover section disposed extended from the upper section to overlie and shield the knuckle of the boom arm from contact with high voltage lines during extension of the bucket lift;

whereby said upper section contacts the boom arm only along each of said plurality of corrugations.

2. The insulated boom knuckle cover for high voltage line truck of claim 1 wherein the upper section attaches overtop the boom arm proximal the knuckle by action of a plurality of strap members disposed to adjustably fasten together around the boom arm and secure the upper section in position shielding the boom arm from direct contact with high voltage lines during extension of the bucket lift.

3. The insulated boom knuckle cover for high voltage line truck of claim 2 wherein the arched knuckle cover includes a first portion, disposed extending the upper section to overhang the knuckle of the boom arm, and a lowermost portion disposed at an obtuse angle relative the first portion, said lowermost portion disposed to overlie and shield the knuckle of the boom arm when said boom arm is disposed in a lowered, folded position, and maintain shielding of said knuckle of the boom arm when the boom arm is extended away from the lowered, folded position.

4. The insulated boom knuckle cover for high voltage line truck of claim 3 wherein the plurality of strap members includes ratchet clamps usable to effect taut securement of the upper section at an appropriate location to depend the arched knuckle cover section overtop the knuckle of the boom arm.

5. The insulated boom knuckle cover for high voltage line truck of claim 4 wherein the upper section and arched knuckle cover are rendered of fiberglass.

6. The insulated boom knuckle cover for high voltage line truck of claim 4 wherein the upper section and arched knuckle cover are rendered of nonconductive polymer.

7. An insulated boom knuckle cover for high voltage line truck comprising:

an insulated sheathing unit attachable overtop a knuckle of an articulated boom arm used for extending a bucket lift to effect maintenance and repair to overhead high voltage lines, said insulated sheathing unit comprising:

an arched fluted upper section attachable to the articulated boom arm above the knuckle, said upper section having:

a convex exterior surface;

a concave interior surface;

a plurality of corrugations disposed longitudinally upon the interior surface, each of said plurality of corrugations disposed to contact atop the boom arm and maintain the upper section away from contact with the boom arm in between each of said plurality of corrugations;

a pair of side wall sections disposed sideway longitudinally bounding the upper section;

a plurality of strap members disposed interiorly upon the interior surface at an attachment point disposed thereon, each of said plurality of strap members having at least a first strap part and a second strap part securable together around the boom arm to effect taut attachment of the upper section thereto; and an arched knuckle cover section disposed extended from the upper section and disposed to overlie the knuckle of the articulated boom arm, said knuckle cover section having:

a first portion disposed coplanar with the upper section; and a lowermost section disposed at an obtuse angle relative the first portion;

wherein the upper section is securable to the boom arm proximal the knuckle and the knuckle cover section is maintainable in an appropriate position to shield the knuckle from contact with a high voltage line to which the bucket lift is oriented by a user, whereby arcing from proximity of the knuckle relative the high voltage line and direct contact with said high voltage line during orientation of the bucket lift is avoidable.

* * * * *